(12) United States Patent
Pourfath et al.

(10) Patent No.: US 12,535,528 B2
(45) Date of Patent: Jan. 27, 2026

(54) MONITORING A RECHARGEABLE BATTERY IN A BATTERY BANK

(71) Applicants: Mahdi Pourfath, Tehran (IR); MohammadReza Razeghizadeh, Tehran (IR); MohammadAmin Serajinejad, Tehran (IR)

(72) Inventors: Mahdi Pourfath, Tehran (IR); MohammadReza Razeghizadeh, Tehran (IR); MohammadAmin Serajinejad, Tehran (IR)

( * ) Notice: Subject to any disclaimer, the term of this patent is extended or adjusted under 35 U.S.C. 154(b) by 580 days.

(21) Appl. No.: 17/959,640

(22) Filed: Oct. 4, 2022

(65) Prior Publication Data

US 2023/0035509 A1 Feb. 2, 2023

Related U.S. Application Data

(63) Continuation-in-part of application No. PCT/IB2022/050338, filed on Jan. 17, 2022.

(60) Provisional application No. 63/140,966, filed on Jan. 25, 2021.

(51) Int. Cl.
| | |
|---|---|
| *G01R 31/389* | (2019.01) |
| *G01K 7/22* | (2006.01) |
| *G01R 31/3842* | (2019.01) |
| *G01R 31/392* | (2019.01) |
| *H01M 10/44* | (2006.01) |
| *H01M 10/48* | (2006.01) |

(52) U.S. Cl.
CPC ............ *G01R 31/389* (2019.01); *G01K 7/22* (2013.01); *G01R 31/3842* (2019.01); *G01R 31/392* (2019.01); *H01M 10/441* (2013.01); *H01M 10/482* (2013.01)

(58) Field of Classification Search
CPC .... G01K 7/22; G01R 31/3842; G01R 31/389; G01R 31/392; H01M 10/441; H01M 10/482; H02J 7/0016; H02J 7/0047; Y02E 60/10
See application file for complete search history.

(56) References Cited

U.S. PATENT DOCUMENTS

| | | | |
|---|---|---|---|
| 2009/0058370 A1* | 3/2009 | Odaohhara | ......... H01M 10/443 320/152 |
| 2015/0198674 A1* | 7/2015 | Kroker | ................ G01R 31/392 324/430 |
| 2021/0356525 A1* | 11/2021 | Van Vroonhoven | ........................ H01M 10/482 |

* cited by examiner

*Primary Examiner* — Yoshihisa Ishizuka

(57) ABSTRACT

A method for monitoring a rechargeable battery in a battery bank. The method includes measuring a plurality of parameters, balancing the rechargeable battery based on a respective voltage of each battery in the battery bank, and determining performance of the rechargeable battery based on the plurality of parameters. Measuring the plurality of parameters includes measuring an electrochemical impedance of the rechargeable battery. Measuring the electrochemical impedance includes generating a plurality of excitation signals, applying each of the plurality of excitation signals to the rechargeable battery, measuring a plurality of AC resistor voltages of a reference resistor coupled to the rechargeable battery in series, measuring a plurality of AC voltages of the rechargeable battery, and calculating the electrochemical impedance by applying an electrochemical impedance spectroscopy method to the plurality of AC resistance voltages and the plurality of AC voltages.

17 Claims, 16 Drawing Sheets

124

MONITORING A RECHARGEABLE BATTERY IN A BATTERY BANK

CROSS-REFERENCE TO RELATED APPLICATION

This application is a continuation-in-part of International Patent Application PCT/IB2022/050338, filed on Jan. 17, 2022, and entitled "MONITORING A RECHARGEABLE BATTERY IN A BATTERY BANK," which takes priority from U.S. Provisional Patent Application Ser. No. 63/140,966 filed on Jan. 25, 2021, and entitled "DESIGN AND IMPLEMENTATION OF NEW PLATFORM FOR ELECTROCHEMICAL IMPEDANCE SPECTROSCOPY OF BATTERY BASED ON ANALOG CIRCUITS", which are both incorporated herein by reference in their entirety.

TECHNICAL FIELD

The present disclosure generally relates to electrical energy management, and particularly, to monitoring of rechargeable batteries.

BACKGROUND

With increasing need for electrical energy management, use of batteries in industrial environments is increasing. Using batteries over time may lead to exhaustion, reduced performance quality as well as irreversible chemical reactions in batteries. Therefore, protection, maintenance, and proper replacement of batteries is crucial, but challenging.

Over charging in a process of charging batteries may negatively impact quality and health life of a battery. For example, in an uninterruptible power supply system, over charging may lead to simultaneous failure of a large number or even all batteries of the system. In extreme cases, over charging may explode batteries. Over charging happens because a voltage of a faulty battery may reach an acceptable level later than healthy batteries due to smaller capacity of faulty batteries compared with healthy batteries. Thus, a charger may continue charging all of batteries due to voltage drop detection. This may cause voltage of healthy batteries to be saturated and gradually, problems mentioned earlier may arise due to internal chemical reactions of batteries such as exothermic reactions.

Continuous monitoring of battery state of health (SoH) and state of charge (SoC) to detect battery failures may prevent mentioned hazards and also may increase a life time of batteries. Monitoring SoH and SoC is a common solution that is used in battery protection and maintenance. Monitoring may be performed using continuous measurement of important parameters of batteries such as voltage, current, temperature, and internal impedance of batteries.

Internal impedance of batteries may increase linearly with decreasing battery capacity. Hence, internal impedance is a key parameter in monitoring SoH and SoC. Electrochemical impedance spectroscopy (EIS) is a safe method for exploring internal processes of electrochemical systems and may be a suitable method for accurately measuring an internal impedance of a battery. In EIS, internal impedance of battery cells may be measured in different frequencies. Using measurement data and post-analysis of data, SoH and SoC may be accurately determined.

Several studies have been conducted on EIS battery management systems. However, conventional monitoring systems use digital data and costly processors to obtain electrochemical impedance of rechargeable batteries that may limit measurement accuracy. There is, therefore, a need for a monitoring system that calculates an electrochemical impedance of a rechargeable battery with high accuracy and low cost.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure describes an exemplary method for monitoring a rechargeable battery in a battery bank. An exemplary method may include measuring a plurality of parameters, balancing the rechargeable battery based on a respective voltage of each battery in the battery bank, and determining performance of the rechargeable battery based on the plurality of parameters. In an exemplary embodiment, the plurality of parameters may be measured utilizing a battery monitoring kit (BMK). In an exemplary embodiment, measuring the plurality of parameters may include measuring an electrochemical impedance of the rechargeable battery. In an exemplary embodiment, the rechargeable battery may be balanced utilizing the one or more processors. In an exemplary embodiment, the rechargeable battery may be balanced based on a respective voltage of each battery in the battery bank. In an exemplary embodiment, performance of the rechargeable battery may be determined utilizing the one or more processors.

In an exemplary embodiment, measuring the electrochemical impedance may include generating a plurality of excitation signals, applying each of the plurality of excitation signals to the rechargeable battery, measuring a plurality of AC resistor voltages of a reference resistor in the BMK, measuring a plurality of AC voltages of the rechargeable battery, and calculating the electrochemical impedance by applying an electrochemical impedance spectroscopy method to the plurality of AC resistor voltages and the plurality of AC voltages. In an exemplary embodiment, the plurality of excitation signals may be generated utilizing a signal generator of the BMK. Each exemplary excitation signal of the plurality of excitation signals may include a respective excitation frequency of a plurality of excitation frequencies. In an exemplary embodiment, applying each of the plurality of excitation signals to the rechargeable battery may include coupling the signal generator to the rechargeable battery. In an exemplary embodiment, measuring the plurality of AC resistor voltages may include coupling an analog interface of the BMK to the rechargeable battery. In an exemplary embodiment, each of the plurality of AC resistor voltages may be associated with a respective excitation signal of the plurality of excitation signals. In an exemplary embodiment, measuring the plurality of AC voltages may include coupling the analog interface to the rechargeable battery. In an exemplary embodiment, each of the plurality of AC voltages may be associated with a respective excitation signal of the plurality of excitation signals. In an exemplary embodiment, the electrochemical impedance may be calculated utilizing one or more processors.

In an exemplary embodiment, measuring the plurality of AC resistor voltages may include passing the plurality of AC resistor voltages through an electrical switch of the analog interface, generating a plurality of DC level shifted resistor voltages, generating a first plurality of filtered resistor voltages from the plurality of DC level shifted resistor voltages, generating a plurality of amplified resistor voltages from the first plurality of filtered resistor voltages, generating a second plurality of filtered resistor voltages from the plurality of amplified resistor voltages, generating a plurality of resistor voltage amplitudes from the second plurality of filtered resistor voltages, generating a plurality of resistor voltage phases from the second plurality of filtered resistor voltages, generating a plurality of digitized resistor voltage amplitudes from the plurality of resistor voltage amplitudes, generating a plurality of digitized resistor voltage phases from the plurality of resistor voltage phases, and sending the plurality of digitized resistor voltage amplitudes and the plurality of digitized resistor voltage phases to the one or more processors. In an exemplary embodiment, generating the plurality of DC level shifted resistor voltages may include applying the plurality of resistor voltages to a DC level shifter of the analog interface. In an exemplary embodiment, generating the first plurality of filtered resistor voltages may include applying the plurality of DC level shifted resistor voltages to a first analog filter of the analog interface. In an exemplary embodiment, generating the plurality of amplified resistor voltages may include applying the plurality of filtered resistor voltages to an amplifier of the analog interface. In an exemplary embodiment, generating the second plurality of filtered resistor voltages may include applying the plurality of amplified resistor voltages to a second analog filter of the analog interface. In an exemplary embodiment, generating the plurality of resistor voltage amplitudes may include applying the second plurality of filtered resistor voltages to an analog peak detector of the analog interface. In an exemplary embodiment, generating the plurality of resistor voltage phases may include applying the second plurality of filtered resistor voltages to an analog phase detector of the analog interface. In an exemplary embodiment, generating the plurality of digitized resistor voltage amplitudes may include applying the plurality of reference voltage amplitudes to an analog-to-digital converter (ADC) of the analog interface. In an exemplary embodiment, generating the plurality of digitized resistor voltage phases may include applying the plurality of reference voltage phases to the ADC.

In an exemplary embodiment, passing the plurality of AC resistor voltages through the electrical switch may include passing the plurality of excitation signals through the reference resistor, and passing the plurality of AC resistor voltages through the electrical switch. In an exemplary embodiment, the plurality of excitation signals may be passed through the reference resistor by coupling the reference resistor to the rechargeable battery in series. In an exemplary embodiment, the plurality of resistor voltages may be passed through the electrical switch utilizing the one or more processors. In an exemplary embodiment, the plurality of resistor voltages may be passed through the electrical switch by coupling the electrical switch to the reference resistor in parallel.

In an exemplary embodiment, measuring the plurality of AC voltages may include passing the plurality of AC voltages through the electrical switch, generating a plurality of DC level shifted battery voltages from the plurality of AC voltages, generating a first plurality of filtered battery voltages from the plurality of DC level shifted battery voltages, generating a plurality of amplified battery voltages from the first plurality of filtered battery voltages, generating a second plurality of filtered battery voltages from the plurality of amplified battery voltages, generating a plurality of battery voltage amplitudes from the second plurality of filtered battery voltages, generating a plurality of battery voltage phases from the second plurality of filtered battery voltages, generating a plurality of digitized battery voltage amplitudes from the plurality of battery voltage amplitudes, generating a plurality of digitized battery voltage phases from the plurality of battery voltage phases, and sending the plurality of digitized battery voltage amplitudes and the plurality of digitized battery voltage phases to the one or more processors. In an exemplary embodiment, passing the plurality of AC voltages through the electrical switch may include coupling the electrical switch to the rechargeable battery in parallel. In an exemplary embodiment, generating the plurality of DC level shifted battery voltages may include applying the plurality of AC voltages of the battery to the DC level shifter. In an exemplary embodiment, generating the first plurality of filtered battery voltages may include applying the plurality of DC level shifted battery voltages to the first analog filter. In an exemplary embodiment, generating the plurality of amplified battery voltages may include applying the plurality of filtered battery voltages to the amplifier. In an exemplary embodiment, generating the second plurality of filtered battery voltages may include applying the plurality of amplified battery voltages to the second analog filter. In an exemplary embodiment, generating the plurality of battery voltage amplitudes may include applying the second plurality of filtered battery voltages to the analog peak detector. In an exemplary embodiment, generating the plurality of battery voltage phases may include applying the second plurality of filtered battery voltages to the analog phase detector. In an exemplary embodiment, generating the plurality of digitized battery voltage amplitudes may include applying the plurality of battery voltage amplitudes to the ADC. In an exemplary embodiment, generating the plurality of digitized battery voltage phases may include applying the plurality of battery voltage phases to the ADC.

In an exemplary embodiment, balancing the rechargeable battery may include measuring a battery voltage of a plurality of battery voltages, obtaining a threshold voltage from the plurality of battery voltages by calculating an average of the plurality of battery voltages, applying a 100% equalization to the rechargeable battery responsive to the battery voltage lying within a first voltage range associated with the threshold voltage, applying a linear 0% to 100% equalization to the rechargeable battery responsive to the battery voltage lying within a second voltage range associated with the threshold voltage, applying a 0% equalization to the rechargeable battery responsive to the battery voltage lying within a third voltage range associated with the threshold voltage. In an exemplary embodiment, obtaining the threshold voltage may include calculating an average of the plurality of battery voltages. In an exemplary embodiment, applying each of the 100% equalization, the linear 0% to 100% equalization, and the 0% equalization may include coupling an equalizer circuit to the rechargeable battery in parallel.

In an exemplary embodiment, measuring the battery voltage may include measuring a voltage difference of a pair of terminals associated with the rechargeable battery, generating a digitized voltage difference by applying the voltage difference to the ADC, and sending the digitized voltage difference to the one or more processors. In an exemplary embodiment, measuring the voltage difference may include coupling a voltage sensor of the BMK to the rechargeable battery.

In an exemplary embodiment, measuring the plurality of parameters may further include measuring a temperature of the rechargeable battery. In an exemplary embodiment, measuring the temperature may include coupling a temperature sensor of the BMK to the rechargeable battery, generating a first DC voltage proportional to the temperature by applying an output of the temperature sensor to a first amplifier of the BMK, digitizing the first DC voltage by applying the DC voltage to the ADC, and sending the ADC output to the one or more processors.

In an exemplary embodiment, measuring the plurality of parameters may further include measuring a battery current passing through the rechargeable battery. In an exemplary embodiment, measuring the battery current may include generating a second DC voltage proportional to the battery current by applying the battery current to a Hall effect sensor, amplifying the second DC voltage by applying the second DC voltage to a second amplifier, digitizing an output of the second amplifier by applying the output of the second amplifier to the ADC, and sending the ADC output to the one or more processors.

In an exemplary embodiment, coupling the equalizer circuit to the rechargeable battery may include directly connecting each terminal of the equalizer circuit to a respective terminal of the rechargeable battery. In an exemplary embodiment, coupling the signal generator to the rechargeable battery may include directly connecting each terminal of the signal generator to a respective terminal of the rechargeable battery. In an exemplary embodiment, coupling the electrical switch to the rechargeable battery may include directly connecting each terminal of the electrical switch to a respective terminal of the rechargeable battery. In an exemplary embodiment, determining performance of the battery may include extracting a state of health (SOH) and a state of charge (SOC) of the rechargeable battery from the plurality of parameters.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein are disclosed an exemplary system and an exemplary method for monitoring a rechargeable battery in a battery bank. An exemplary system may include a battery monitoring kit (BMK) for measuring voltage difference, current, temperature, and electrochemical impedance of the rechargeable battery. An exemplary electrochemical impedance of the rechargeable battery may be used to obtain a state of health (SoH) of the rechargeable battery. Exemplary voltage difference and current of the rechargeable battery may be used to obtain a state of charge of the rechargeable battery. An exemplary system may further include an equalizer circuit that prevents the rechargeable battery from being overcharged.

Figure 1A:
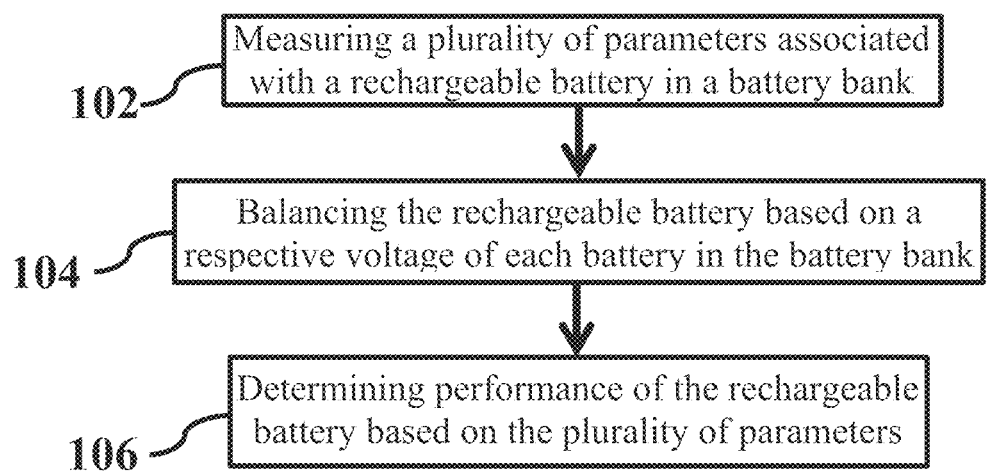
FIG. 1A shows a flowchart of a method for monitoring a rechargeable battery in a battery bank, consistent with one or more exemplary embodiments of the present disclosure.

FIG. 1A shows a flowchart of a method for monitoring a rechargeable battery in a battery bank, consistent with one or more exemplary embodiments of the present disclosure. An exemplary method 100 may include measuring a plurality of parameters associated with a rechargeable battery in a battery bank (step 102), balancing the rechargeable battery based on a respective voltage of each battery in the battery bank (step 104), and determining performance of the rechargeable battery based on the plurality of parameters (step 106).

Figure 2A:
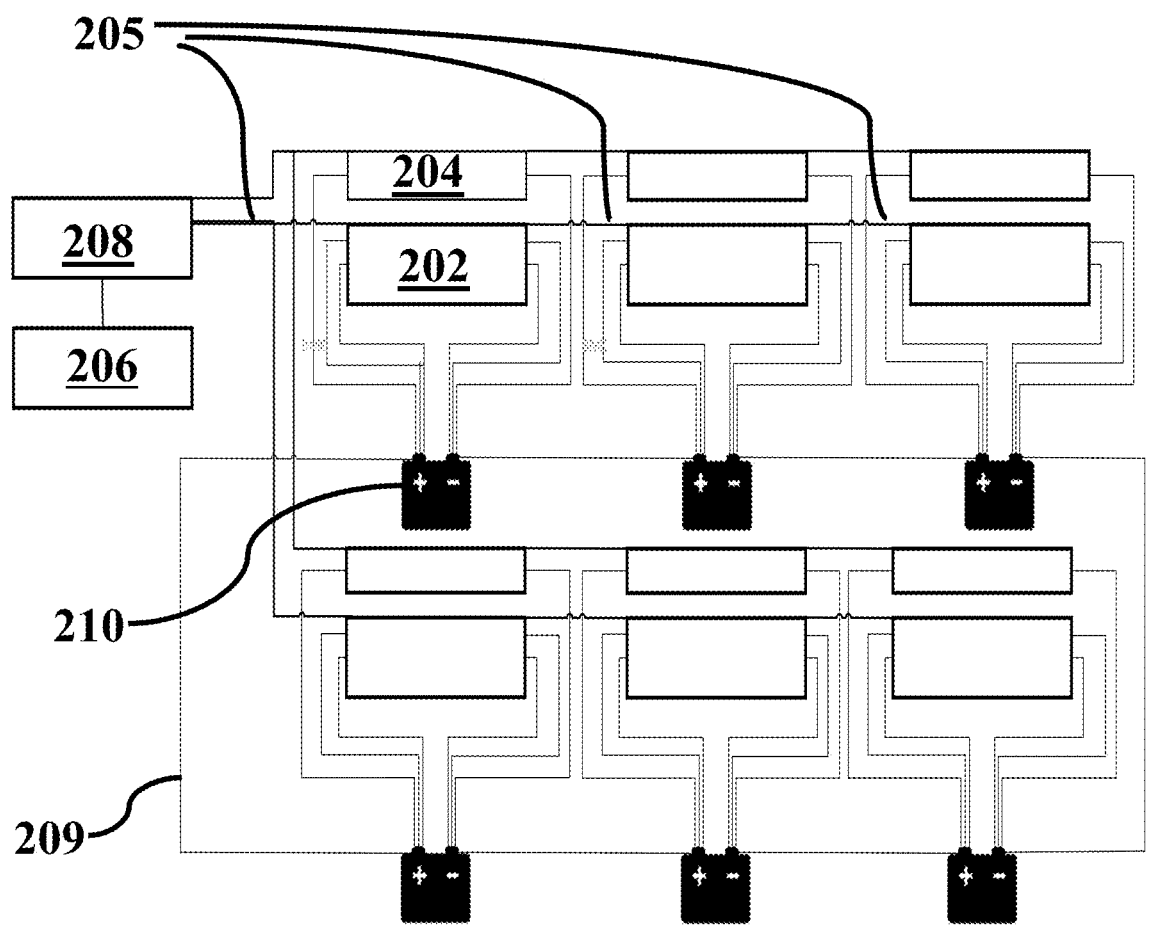
FIG. 2A shows a block diagram of a system for monitoring a rechargeable battery in a battery bank, consistent with one or more exemplary embodiments of the present disclosure.

FIG. 2A shows a block diagram of a system for monitoring a rechargeable battery in a battery bank, consistent with one or more exemplary embodiments of the present disclosure. In an exemplary embodiment, system 200 may include, a battery monitoring kit (BMK) 202, an equalizer circuit 204, a memory 206, and a processor 208. In an exemplary embodiment, different steps of method 100 may be implemented utilizing system 200. In an exemplary embodiment, system 200 may be configured to monitor and manage a battery bank 209. In an exemplary embodiment, BMK 202 may be configured to monitor a rechargeable battery 210 in battery bank 209. In an exemplary embodiment, equalizer circuit 204 may be coupled to rechargeable battery 210. In an exemplary embodiment, processor 208 may be configured to access memory 206 and execute processor-readable instructions stored in memory 206.

In an exemplary embodiment, battery bank 209 may include a number of batteries that are interconnected in series and parallel arrangements. In an exemplary embodiment, each battery (similar to rechargeable battery 210) in battery bank 209 may be connected to a respective BMK (similar to BMK 202). In an exemplary embodiment, each BMK may be connected to processor 208 using a plurality of data communication cables 205.

Figure 1B:
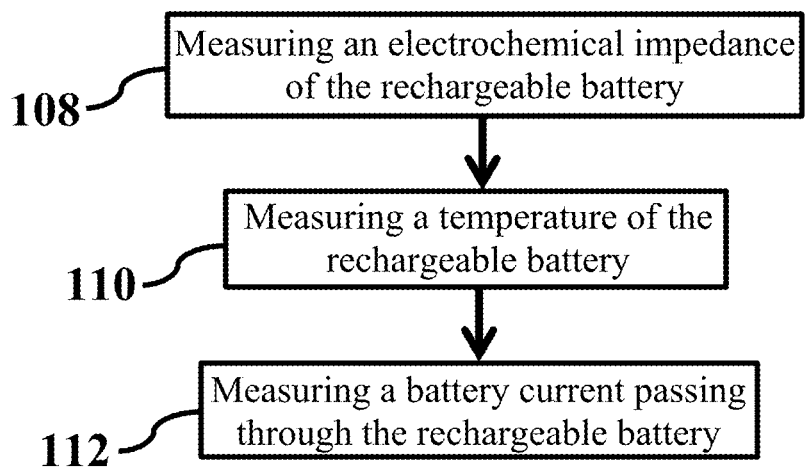
FIG. 1B shows a flowchart of a method for measuring a plurality of parameters associated with a rechargeable battery, consistent with one or more exemplary embodiments of the present disclosure.

Referring to FIG. 1A, in an exemplary embodiment, step 102 may include measuring the plurality of parameters. In further detail with respect to step 102, FIG. 1B shows a flowchart of a method for measuring a plurality of parameters associated with a rechargeable battery, consistent with one or more exemplary embodiments of the present disclosure. Referring to FIGS. 1B and 2A, in an exemplary embodiment, measuring the plurality of parameters may include measuring an electrochemical impedance of rechargeable battery 210 (step 108), measuring a temperature of rechargeable battery 210 (step 110), and measuring a battery current passing through rechargeable battery 210 (step 112).

Figure 1C:
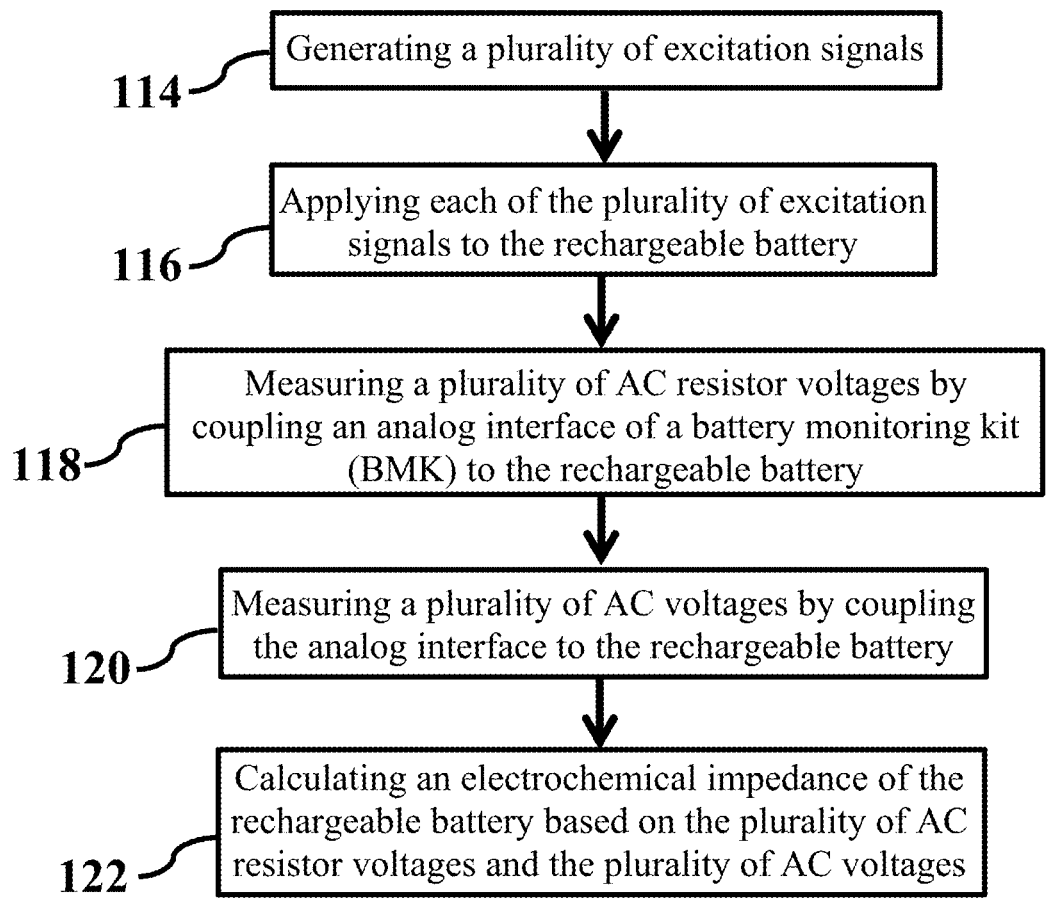
FIG. 1C shows a flowchart of a method for measuring an electrochemical impedance of a rechargeable battery, consistent with one or more exemplary embodiments of the present disclosure.

In further detail regarding step 108, FIG. 1C shows a flowchart of a method for measuring an electrochemical impedance of a rechargeable battery, consistent with one or more exemplary embodiments of the present disclosure. Referring to FIGS. 1C and 2A, in an exemplary embodiment, measuring the electrochemical impedance may include generating a plurality of excitation signals (step 114), applying each of the plurality of excitation signals to rechargeable battery 210 (step 116), measuring a plurality of AC resistor voltages of a resistor in BMK 202 (step 118), measuring a plurality of AC voltages from rechargeable battery 210 (step 120), and calculating the electrochemical impedance based on the plurality of AC resistor voltages and the plurality of AC voltages (step 122).

Figure 2B:
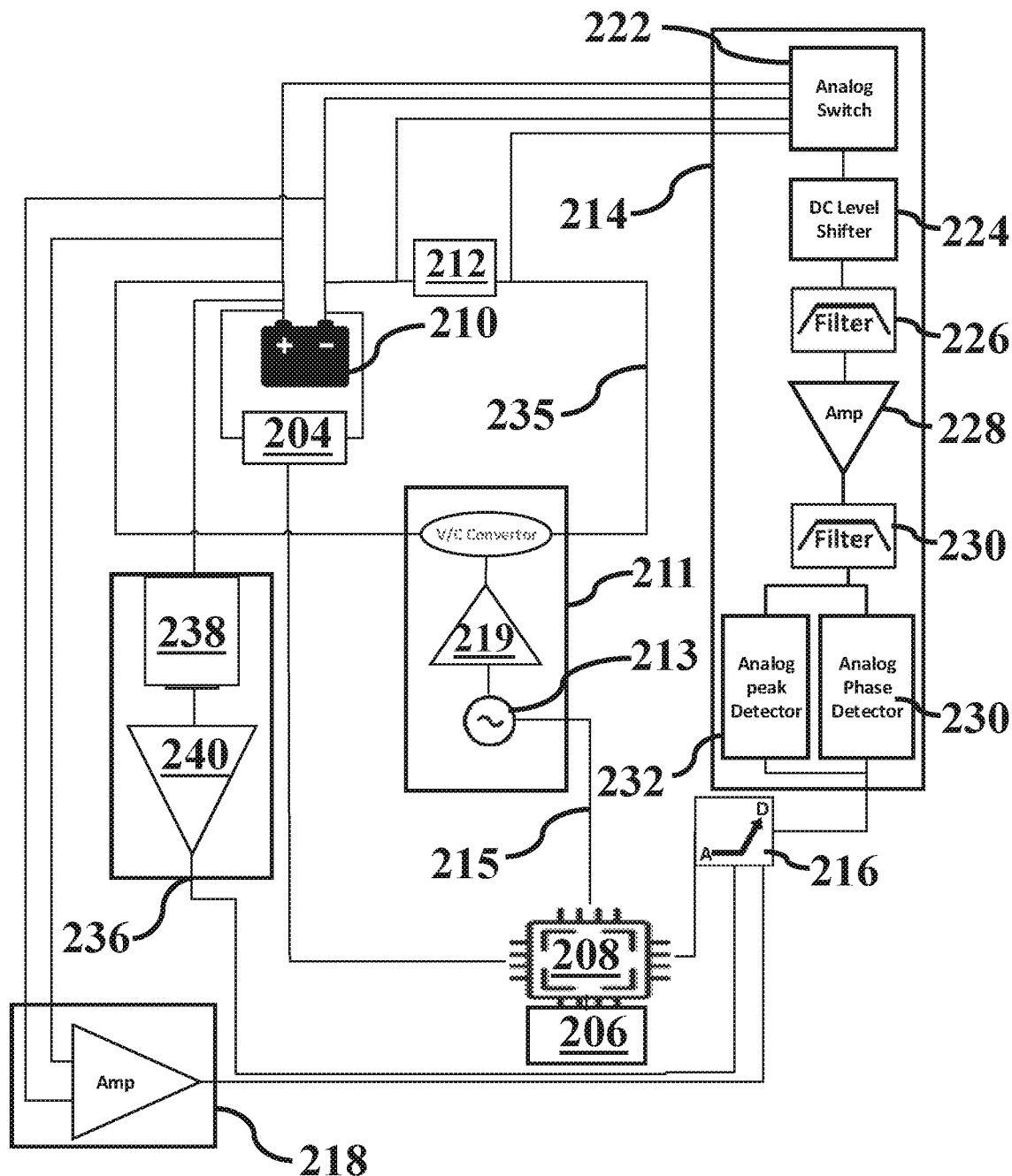
FIG. 2B shows a block diagram of a battery monitoring kit (BMK), consistent with one or more exemplary embodiments of the present disclosure.

FIG. 2B shows a block diagram of a battery monitoring kit (BMK), consistent with one or more exemplary embodiments of the present disclosure. In an exemplary embodiment, BMK 202 may include a signal generator 211, a reference resistor 212, an analog interface 214, an analog-to-digital converter (ADC) 216, and a voltage sensor 218. In an exemplary embodiment, signal generator 211 may be directly connected to rechargeable battery 210. In an exemplary embodiment, coupling signal generator 211 to rechargeable battery 210 may include directly connecting of each terminal of signal generator 211 to a respective terminal of rechargeable battery 210. In an exemplary embodiment, signal generator 211 may include a programmable oscillator IC 213 with variable frequency. In an exemplary embodiment, reference resistor 212 may be coupled to rechargeable battery 210 in series. In an exemplary embodiment, analog interface 214 may be coupled to rechargeable battery 210. In an exemplary embodiment, ADC 216 may be coupled to analog interface 214. In an exemplary embodiment, voltage sensor 218 may be coupled to rechargeable battery 210.

Referring to FIGS. 1C and 2B, in an exemplary embodiment, step 114 may include generating the plurality of excitation signals. Each exemplary excitation signal may include a sinusoidal wave. In an exemplary embodiment, programmable oscillator IC 213 may be programmed by processor 208 to generate sinusoidal waves with different frequencies. In an exemplary embodiment, programmable oscillator IC 213 may communicate with processor 208 via a SPI port 215. In an exemplary embodiment, the generated sinusoidal waves may flow through a circuit loop 235. In an exemplary embodiment, to measure the electrochemical impedance, an AC current signal with an amplitude in a range of a few amps (for example, between 1 and 10 A) may be needed. Therefore, in an exemplary embodiment, before applying a sinusoidal signal to rechargeable battery 210, the sinusoidal signal may enter a Darlington transistor amplifier 219 so that an amplitude of the sinusoidal signal may be amplified to a range of a few amps. In an exemplary embodiment, the electrochemical impedance may be in a milliohm range. As a result, in an exemplary embodiment, a value of reference resistor 212 may be selected in a milliohm range as well. An exemplary 50 mΩ resistor may be used in BMK 202. In an exemplary embodiment, in addition to obtaining a voltage of rechargeable battery 210, reading a voltage of reference resistor 212 may be needed. In an exemplary embodiment, an error in reading voltage values of reference resistor 212 and rechargeable battery 210 may be reduced by using a common circuit for voltage measurement.

In further detail with regards to step 116, in an exemplary embodiment, applying each of the plurality of excitation signals to rechargeable battery 210 may include coupling signal generator 211 to rechargeable battery 210 and applying the plurality of excitation signal to rechargeable battery 210 utilizing Darlington pair transistor 219. In an exemplary embodiment, a frequency of an excitation signal may be set in a range of 0.1 Hz to 200 kHz. In an exemplary embodiment, since a maximum current of excitation buffer source may be in a range of a few mA (for example, between 1 and 10 mA), a current amplifier may be required. An exemplary battery may require an excitation signal of up to a few amps.

Figure 1D:
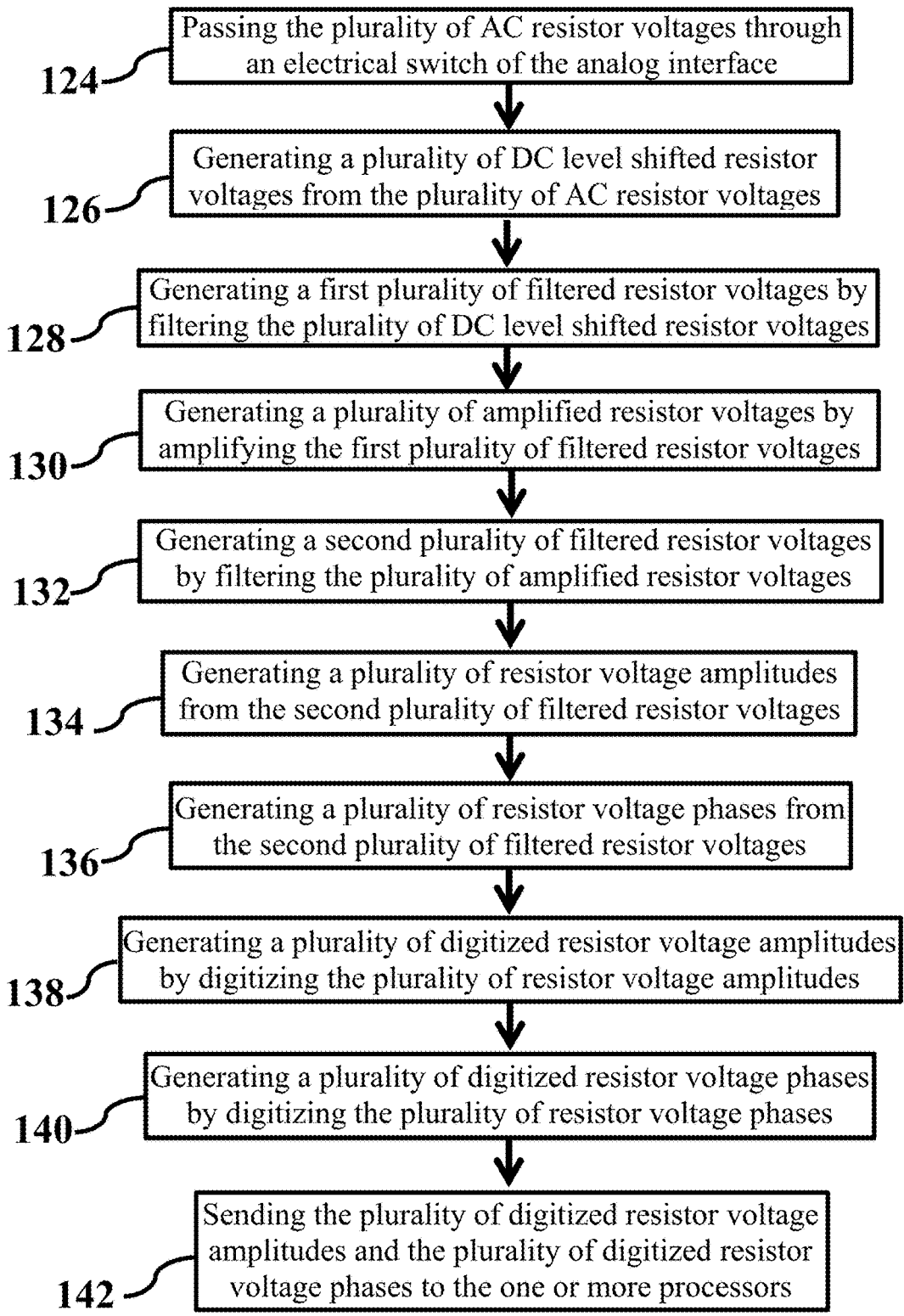
FIG. 1D shows a flowchart for measuring a plurality of AC resistor voltages, consistent with one or more exemplary embodiments of the present disclosure.

In further detail with regards to step 118, FIG. 1D shows a flowchart for measuring a plurality of AC resistor voltages, consistent with one or more exemplary embodiments of the present disclosure. Referring to FIGS. 1D and 2B, in an exemplary embodiment, measuring the plurality of AC resistor voltages may include coupling analog interface 214 to rechargeable battery 210. In an exemplary embodiment coupling analog interface 214 to rechargeable battery 210 may include passing the plurality of AC resistor voltages through an electrical switch of analog interface 214 (step 124), generating a plurality of DC level shifted resistor voltages from the plurality of AC resistor voltages (step 126), generating a first plurality of filtered resistor voltages by filtering the plurality of DC level shifted resistor voltages (step 128), generating a plurality of amplified resistor voltages by amplifying the first plurality of filtered resistor voltages (step 130), generating a second plurality of filtered resistor voltages by filtering the plurality of amplified resistor voltages (step 132), generating a plurality of resistor voltage amplitudes from the second plurality of filtered resistor voltages (step 134) generating a plurality of resistor voltage phases from the second plurality of filtered resistor voltages (step 136), generating a plurality of digitized resistor voltage amplitudes by digitizing the plurality of resistor voltage amplitudes (step 138), generating a plurality of digitized resistor voltage phases by digitizing the plurality of resistor voltage phases (step 140), and sending the plurality of digitized resistor voltage amplitudes and the plurality of digitized resistor voltage phases to processor 208 (step 142).

In an exemplary embodiment, analog interface 214 may include an electrical switch 222, a DC level shifter 224, a first analog filter 226, an amplifier 228, a second analog filter 230, an analog peak detector 232, and an analog phase detector 234. In an exemplary embodiment, electrical switch 222 may be coupled to rechargeable battery 210. In an exemplary embodiment, coupling electrical switch 222 to rechargeable battery 210 may include directly connecting of each terminal of electrical switch 222 to a respective terminal of rechargeable battery 210. In an exemplary embodiment, DC level shifter 224 may be coupled to electrical switch 222. In an exemplary embodiment, first analog filter 226 may be coupled to DC level shifter 224. In an exemplary embodiment, amplifier 228 may be coupled to first analog filter 226. In an exemplary embodiment, second analog filter 230 may be coupled to amplifier 228. In an exemplary embodiment, each of analog peak detector 232 and analog phase detector 234 may be coupled second analog filter 230.

Figure 1E:
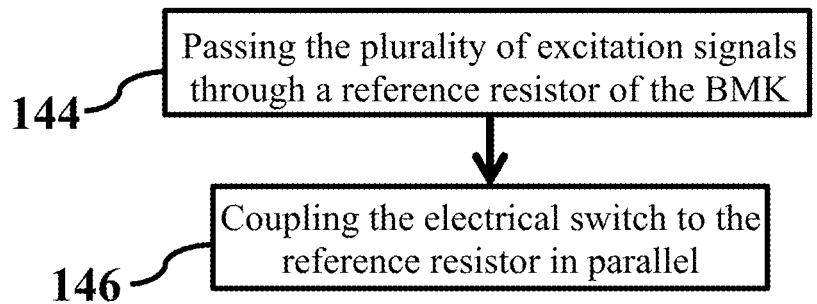
FIG. 1E shows a flowchart for passing a plurality of resistor voltages through an electrical switch, consistent with one or more exemplary embodiments of the present disclosure.

In further detail with regards to step 124, FIG. 1E shows a flowchart for passing a plurality of AC resistor voltages through an electrical switch, consistent with one or more exemplary embodiments of the present disclosure. In an exemplary embodiment, each of the plurality of AC resistor voltages may be generated by a respective excitation signal of the plurality of excitation signals. In an exemplary embodiment, an "AC resistor voltage" may refer to an AC voltage that is generated between two ends of the reference resistor due to passing an excitation signal through the reference resistor. Referring to FIGS. 1E and 2B, in an exemplary embodiment, passing the plurality of AC resistor voltages through electrical switch 222 may include passing the plurality of excitation signals through reference resistor 212 (step 144), and coupling the electrical switch to the reference resistor in parallel (step 146).

In further detail with respect to step 144, in an exemplary embodiment, passing the plurality of excitation signals through reference resistor 212 may include coupling reference resistor 212 to rechargeable battery 210 in series. As a result, an exemplary plurality of excitation signals may flow through reference resistor 212 from rechargeable battery 210.

In an exemplary embodiment, step 146 may include coupling electrical switch 222 to reference resistor 212 in parallel. In an exemplary embodiment, electrical switch 222 may include a dual-channel analog DPDT switch. In an exemplary embodiment, electrical switch 222 may switch between two channels based on switching commands from processor 208, a first channel including two ends of reference resistor 212 and a second channel including two ends of rechargeable battery 210. An exemplary first switching command may be sent to electrical switch 222 by processor 208 to set electrical switch 222 at the first channel so that electrical switch 222 may be coupled to reference resistor 212 in parallel. Therefore, a voltage of electrical switch 222 may become equal to the voltage of reference resistor 212. As a result, the plurality of AC resistor voltages may pass through electrical switch 222.

Referring again to FIGS. 1D and 2B, in an exemplary embodiment, step 126 may include generating the plurality of DC level shifted resistor voltages from the plurality of AC resistor voltages. For this purpose, an exemplary plurality of AC resistor voltages may be applied to DC level shifter 224. An exemplary DC level shifter may remove a DC value of an input signal. Therefore, in an exemplary embodiment, DC values of the plurality of AC resistor voltages may be removed upon being applied to DC level shifter 224 to obtain the plurality of DC level shifted resistor voltages.

In an exemplary embodiment, step 128 may include generating the first plurality of filtered resistor voltages by filtering the plurality of DC level shifted resistor voltages. For this purpose, an exemplary plurality of DC level shifted resistor voltages may be applied to first analog filter 226. In an exemplary embodiment, first analog filter 226 may remove high frequency components of the plurality of DC level shifted resistor voltages to obtain the first plurality of filtered resistor voltages.

In an exemplary embodiment, step 130 may include generating the plurality of amplified resistor voltages by amplifying the first plurality of filtered resistor voltages. For this purpose, an exemplary first plurality of filtered resistor voltages may be applied to amplifier 228. In an exemplary embodiment, amplifier 228 may increase amplitudes of first plurality of filtered resistor voltages to obtain the plurality of amplified resistor voltages.

In an exemplary embodiment, step 132 may include generating the second plurality of filtered resistor voltages by filtering the plurality of amplified resistor voltages. For this purpose, an exemplary plurality of amplified resistor voltages may be applied to second analog filter 230. In an exemplary embodiment, second analog filter 230 may remove high frequency noise components that may be present in the plurality of amplified resistor voltages as a result of amplification by amplifier 228 to obtain the second plurality of filtered resistor voltages.

For further detail with respect to step 134, in an exemplary embodiment, generating the plurality of resistor voltage amplitudes may include applying the second plurality of filtered resistor voltages to analog peak detector 232. In an exemplary embodiment, peak detection circuit of analog peak detector 232 may deliver a DC voltage level corresponding to an amplitude of an input signal as an output using a differential amplifier and an array of diodes and capacitors. Therefore, each exemplary resistor voltage amplitude may be produced at an output of analog peak detector 232 by delivering a DC voltage level of a corresponding filtered resistor voltage.

In an exemplary embodiment, step 136 may include generating the plurality of resistor voltage phases by applying the second plurality of filtered resistor voltages to analog phase detector 234. In an exemplary embodiment, in analog phase detector 234, a measured sine signal may first be converted to a pulse using an interface circuit. In an exemplary embodiment, phases of input signals may be extracted by connecting analog phase detector 234 to processor 208. As a result, in an exemplary embodiment, analog phase detector 234 may extract a phase of each of the second plurality of filtered resistor voltages to obtain the plurality of resistor voltage phases.

In further detail with regards to step 138, in an exemplary embodiment, generating a plurality of digitized resistor voltage amplitudes may include digitizing the plurality of resistor voltage amplitudes by applying the plurality of resistor voltage amplitudes to ADC 216. In an exemplary embodiment, ADC 216 may convert its input data to a digital number. Therefore, an exemplary resistor voltage amplitude may be converted to a digital number to obtain a corresponding digitized resistor voltage amplitude.

In an exemplary embodiment, step 140 may include generating a plurality of digitized resistor voltage phases by digitizing the plurality of resistor voltage phases. For this purpose, an exemplary plurality of resistor voltage phases may be applied to ADC 216. In an exemplary embodiment, to avoid incurring additional costs in BMK 202, instead of using a separate ADC (similar to ADC 216), an ADC central controller unit may be utilized. In addition, in an exemplary embodiment, using a microcontroller's built-in ADC unit alongside analog interface 214 may increase measurement accuracy.

In an exemplary embodiment, step 142 may include sending the plurality of digitized resistor voltage amplitudes and the plurality of digitized resistor voltage phases to processor 208. For this purpose, in an exemplary embodiment, ADC 216 may be coupled to processor 208 to provide processor 208 with the plurality of digitized resistor voltage amplitudes and the plurality of digitized resistor voltage phases.

Figure 1F:
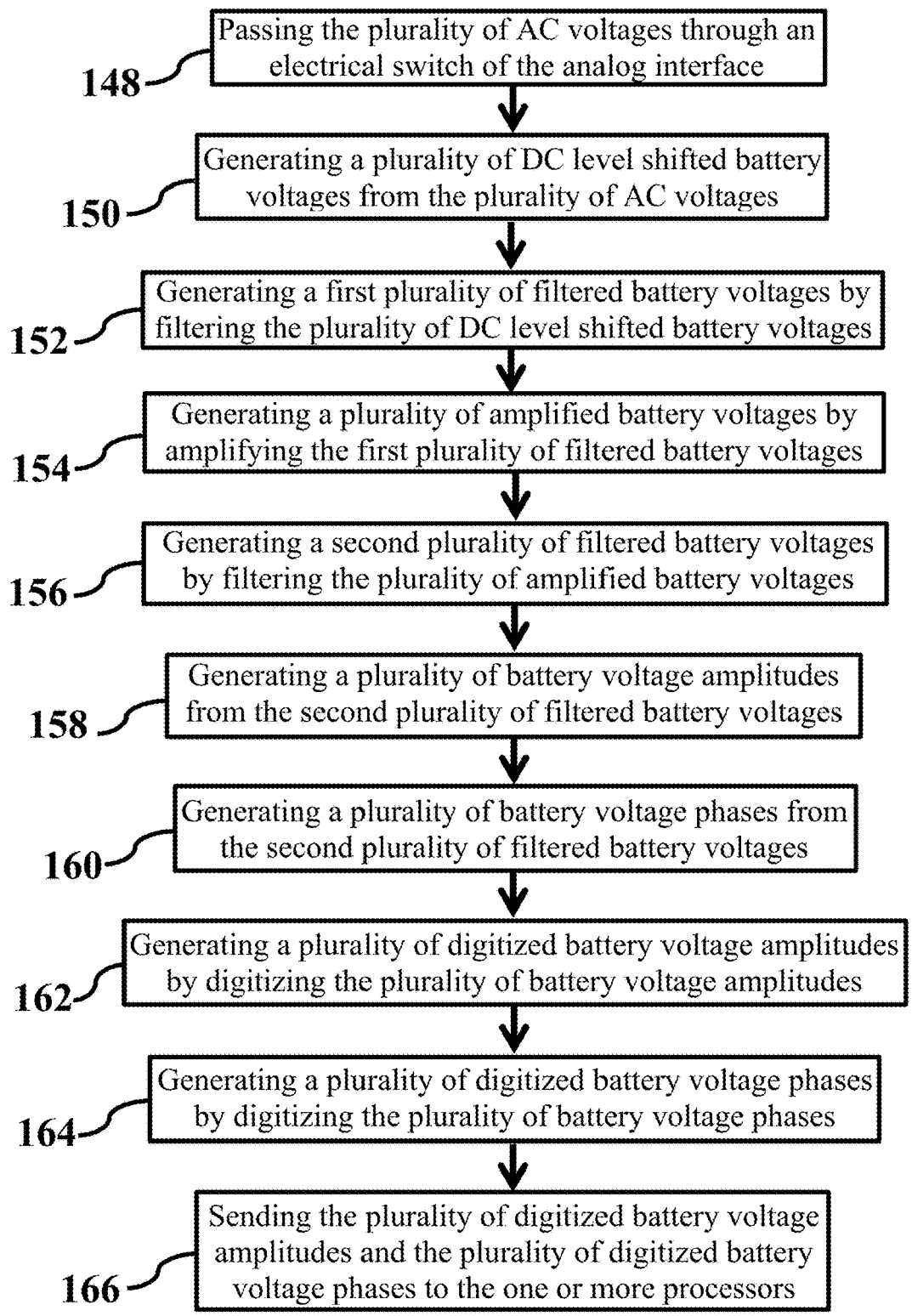
FIG. 1F shows a flowchart for measuring the plurality of AC voltages, consistent with one or more exemplary embodiments of the present disclosure.

FIG. 1F shows a flowchart for measuring a plurality of AC voltages, consistent with one or more exemplary embodiments of the present disclosure. Referring to FIGS. 1F and 2B, in an exemplary embodiment, step 120 may include measuring the plurality of AC voltages by coupling analog interface 214 to rechargeable battery 210. In an exemplary embodiment, measuring the plurality of AC voltages may include passing the plurality of AC voltages through electrical switch 222 (step 148), generating a plurality of DC level shifted battery voltages from the plurality of AC voltages (step 150), generating a first plurality of filtered battery voltages by filtering the plurality of DC level shifted battery voltages (step 152), generating a plurality of amplified battery voltages by amplifying the first plurality of filtered battery voltages (step 154), generating a second plurality of filtered battery voltages by filtering the plurality of amplified battery voltages (step 156), generating a plurality of battery voltage amplitudes from the second plurality of filtered battery voltages (step 158) generating a plurality of battery voltage phases from the second plurality of filtered battery voltages (step 160), generating a plurality of digitized battery voltage amplitudes by digitizing the plurality of battery voltage amplitudes (step 162), generating a plurality of digitized battery voltage phases by digitizing the plurality of battery voltage phases (step 164), and sending the plurality of digitized battery voltage amplitudes and the plurality of digitized battery voltage phases to processor 208 (step 166).

For further detail with respect to step 148, in an exemplary embodiment, passing the plurality of AC voltages through electrical switch 222 may include coupling electrical switch 222 to rechargeable battery 210 in parallel. In an exemplary embodiment, electrical switch 222 may be coupled to rechargeable battery 210 utilizing processor 208. As mentioned above, in an exemplary embodiment, electrical switch 222 may switch between the first channel including the two ends of reference resistor 212 and the second channel including the two ends of rechargeable battery 210 based on switching commands from processor 208. An exemplary second switching command may be sent to electrical switch 222 by processor 208 to set electrical switch 222 at the second channel so that electrical switch 222 may be coupled to rechargeable battery 210 in parallel. Therefore, a voltage of electrical switch 222 may become equal to the voltage of rechargeable battery 210. As a result, the plurality of AC voltages may pass through electrical switch 222.

In further detail regarding step 150, in an exemplary embodiment, generating the plurality of DC level shifted battery voltages may include applying the plurality of AC voltages to DC level shifter 224. In an exemplary embodiment, DC values of the plurality of AC voltages may be removed upon being applied to DC level shifter 224 to obtain the plurality of DC level shifted battery voltages.

In an exemplary embodiment, step 152 may include generating the first plurality of filtered battery voltages by filtering the plurality of DC level shifted battery voltages. For this purpose, an exemplary plurality of DC level shifted battery voltages may be applied to first analog filter 226. In an exemplary embodiment, first analog filter 226 may remove high frequency components of the plurality of DC level shifted battery voltages to obtain the first plurality of filtered battery voltages.

In an exemplary embodiment, step 154 may include generating the plurality of amplified battery voltages by amplifying the first plurality of filtered battery voltages. For this purpose, an exemplary first plurality of filtered battery voltages may be applied to amplifier 228. In an exemplary embodiment, amplifier 228 may increase amplitudes of first plurality of filtered battery voltages to obtain the plurality of amplified battery voltages.

In an exemplary embodiment, step 156 may include generating the second plurality of filtered battery voltages by filtering the plurality of amplified battery voltages. For this purpose, an exemplary plurality of amplified battery voltages may be applied to second analog filter 230. In an exemplary embodiment, second analog filter 230 may remove high frequency noise components that may be present in the plurality of amplified battery voltages as a result of amplification by amplifier 228 to obtain the second plurality of filtered battery voltages.

For further detail with respect to step 158, in an exemplary embodiment, generating the plurality of battery voltage amplitudes may include applying the second plurality of filtered battery voltages to analog peak detector 232. In an exemplary embodiment, analog peak detector 232 may produce each exemplary battery voltage amplitude by delivering a DC voltage level of a corresponding filtered battery voltage.

In an exemplary embodiment, step 160 may include generating the plurality of battery voltage phases by applying the second plurality of filtered battery voltages to analog phase detector 234. In an exemplary embodiment, analog phase detector 234 may extract a phase of each of the second plurality of filtered battery voltages to obtain the plurality of battery voltage phases.

In further detail with regard to step 162, in an exemplary embodiment, digitizing the plurality of battery voltage amplitudes may include applying the plurality of battery voltage amplitudes to ADC 216. In an exemplary embodiment, ADC 216 may convert each battery voltage amplitude to a digital number to obtain a corresponding digitized battery voltage amplitude.

In an exemplary embodiment, step 164 may include digitizing the plurality of battery voltage phases by applying the plurality of battery voltage phases to ADC 216. In an exemplary embodiment, ADC 216 may convert each battery voltage phase to a digital number to obtain a corresponding digitized battery voltage phase.

In an exemplary embodiment, step 166 may include sending the plurality of digitized battery voltage amplitudes and the plurality of digitized battery voltage phases to processor 208. In an exemplary embodiment, ADC 216 may be connected to processor 208 to provide processor 208 with the plurality of digitized battery voltage amplitudes and the plurality of digitized battery voltage phases.

Referring again to FIGS. 1C and 2A, in an exemplary embodiment, step 122 may include calculating an electrochemical impedance of rechargeable battery 210. An exemplary electrochemical impedance may be calculated utilizing processor 208. In an exemplary embodiment, the electrochemical impedance may be calculated by applying an exemplary electrochemical impedance spectroscopy (EIS) method on the plurality of AC resistor voltages and the plurality of AC voltages. In an exemplary embodiment, BMK 202 may measure the electrochemical impedance, voltage, current and temperature of rechargeable battery 210. In an exemplary embodiment, measurement and calculation of impedance in system 200 may be done based on an EIS method. Since batteries may be nonlinear, a behavior of batteries may be quasi-linearly analyzed using small samples of voltage-current curves. In an exemplary EIS method, sine signals with amplitudes in order of millivolts may be applied to a quasi-linear system as inputs. An exemplary response of a quasi-linear system may be a sine signal with a frequency equal to a frequency of an input signal, but amplitude and phase of the response may be different. In an exemplary embodiment, an alternating excitation signal may be applied to rechargeable battery 210 in a same way as in an exemplary EIS method. As a result, in an exemplary embodiment, the electrochemical impedance may be obtained from a response of rechargeable battery 210. Obtained information in the EIS method may usually be displayed using a Nyquist diagram. In the Nyquist diagram, an imaginary component of impedance (vertical axis) may be plotted in terms of a real component of impedance (horizontal axis).

Figure 3A:
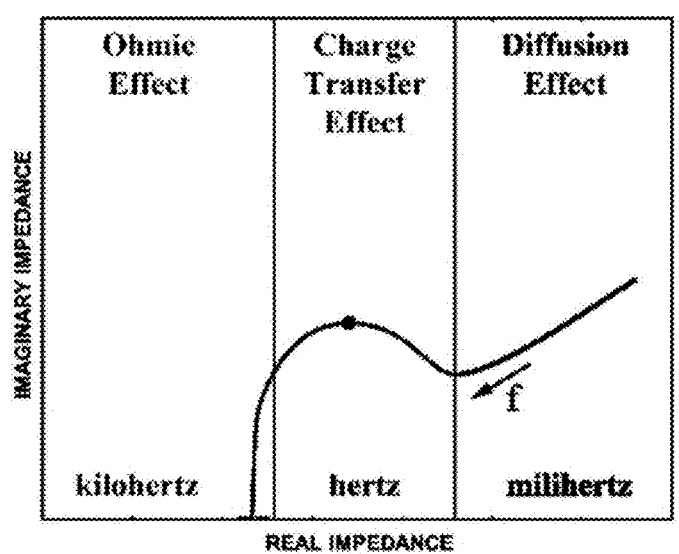
FIG. 3A shows a Nyquist battery impedance diagram, consistent with one or more exemplary embodiments of the present disclosure.

FIG. 3A shows a Nyquist battery impedance diagram, consistent with one or more exemplary embodiments of the present disclosure. As shown in FIG. 3A, different areas of the Nyquist diagram for batteries may be related to different physical and chemical processes that may take place inside batteries. Various battery-related processes may be modeled using a resistor, a capacitor, or a Warburg Resistor (W). An exemplary Warburg resistor may be related to a diffusion phenomenon in batteries. Using Nyquist diagram analysis, a value of each element in orbital models may be obtained.

Figure 3B:
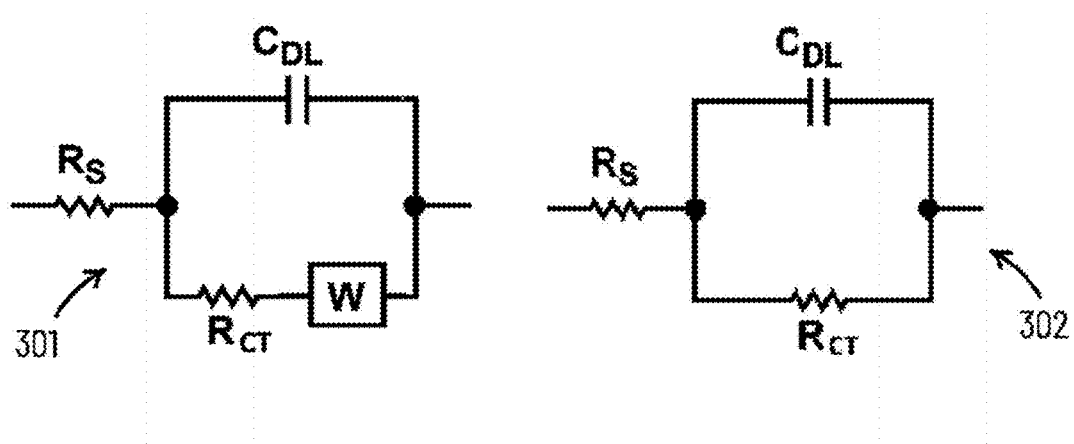
FIG. 3B shows two common circuit models for measuring an impedance of a battery, consistent with one or more exemplary embodiments of the present disclosure.

FIG. 3B shows two common circuit models for measuring an impedance of a battery, consistent with one or more exemplary embodiments of the present disclosure. Impedance models may include a Warburg circuit model 301 and a Randles circuit model 302. An exemplary response of the EIS method, depending on a type of circuit model considered, may be obtained one of the two circuits in FIG. 3B as an internal impedance of a battery, as described below.

Since exemplary EIS measurements may include ratio metrics, an AC signal may be applied to a known reference resistor 212 with known resistance $R_{Reference}$. Then, in an exemplary embodiment, a voltage response $V_{R_{Reference}}$ of reference resistor 212 may be measured for measuring an unknown impedance $Z_{unknown}$. A value of an exemplary current passing through reference resistor 212 may be equal to $V_{R_{Reference}}/R_{Reference}$. On the other hand, in an exemplary embodiment, a similar signal may be applied to an unknown impedance and a voltage response $V_{Z_{unknown}}$ may be measured. In an exemplary embodiment, an exemplary unknown impedance $Z_{unknown}$ may be calculated using an equation as follows:

$$Z_{unknown} = \frac{V_{Z_{unknown}}}{V_{R_{Reference}}} \times R_{Refference} \qquad \text{Equation (1)}$$

Figure 1G:
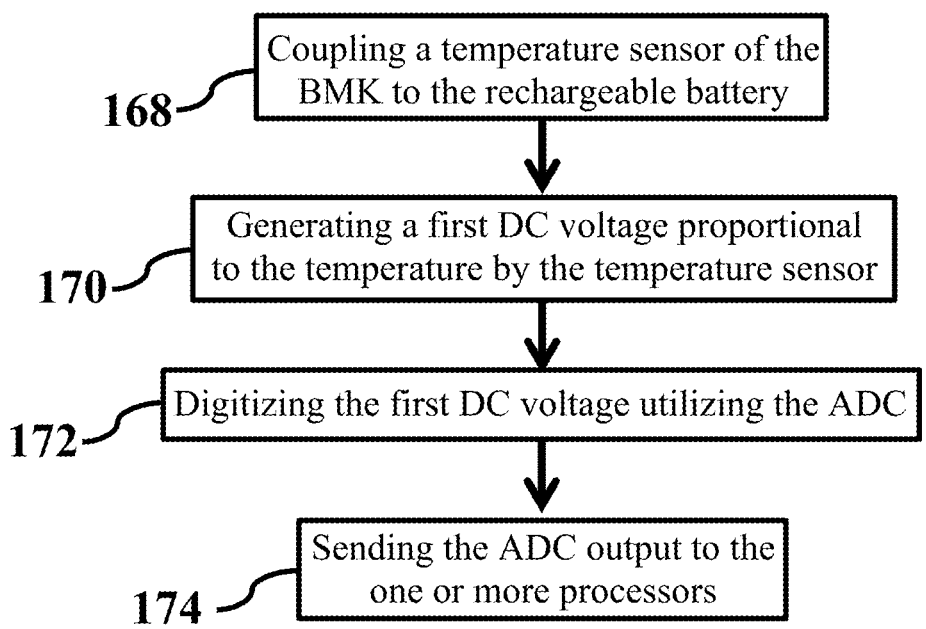
FIG. 1G shows a flowchart for measuring a temperature of a rechargeable battery, consistent with one or more exemplary embodiments of the present disclosure.
Figure 1H:
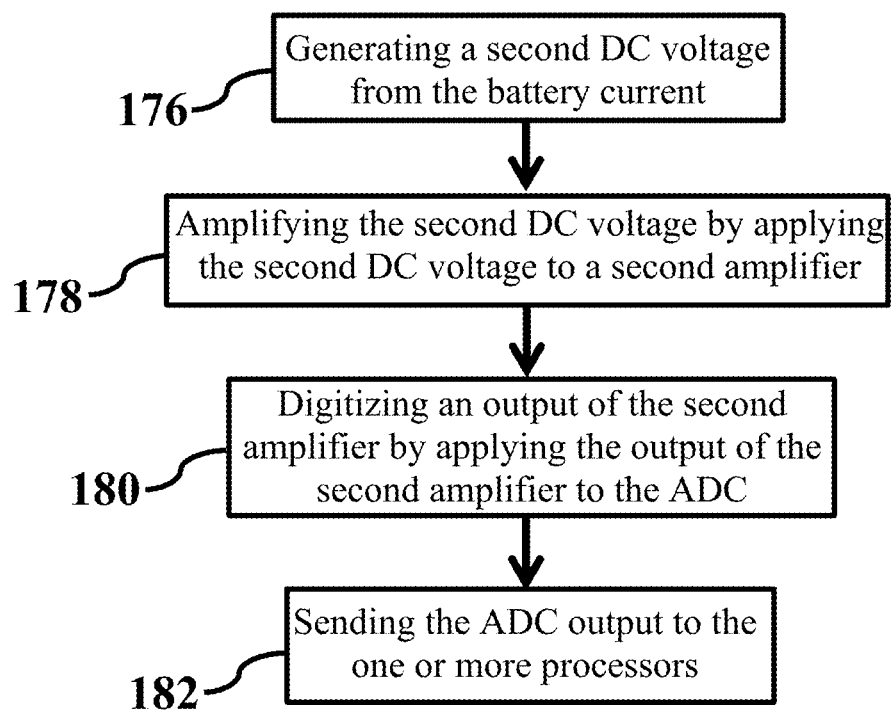
FIG. 1H shows a flowchart for measuring a battery current passing through a rechargeable battery, consistent with one or more exemplary embodiments of the present disclosure.

Referring again to FIGS. 1B and 2B, in an exemplary embodiment, step 110 may include measuring the temperature of rechargeable battery 210. In further detail with regards to step 110, FIG. 1G shows a flowchart for measuring a temperature of a rechargeable battery, consistent with one or more exemplary embodiments of the present disclosure. Referring to FIGS. 1G and 2B, in an exemplary embodiment, measuring a temperature of rechargeable battery 210 may include coupling a temperature sensor of BMK 202 to rechargeable battery 210 (step 168), generating a first DC voltage proportional to the temperature by the temperature sensor (step 170) digitizing the first DC voltage utilizing ADC 216 (step 172), and sending an output of ADC 216 to processor 208 (step 174).

For further detail with respect to step 168, in an exemplary embodiment, BMK 202 may further include a temperature sensor 236. In an exemplary embodiment, temperature sensor 236 may include a thermistor 238 and an amplifier 240. In an exemplary embodiment, thermistor 238 may be coupled to amplifier 240. In an exemplary embodiment, thermistor 238 may include a negative temperature coefficient thermistor. In an exemplary embodiment, amplifier 240 may include one or more amplifiers. In an exemplary embodiment, coupling temperature sensor 236 to rechargeable battery 210 in step 168 may cause temperature sensor 236 to generate a DC voltage level proportional to an ambient temperature of rechargeable battery 210.

In an exemplary embodiment, step 170 may include generating the first DC voltage that is proportional to the temperature by temperature sensor 236. In an exemplary embodiment, generating the first DC voltage may include applying an output of thermistor 238 to amplifier 240. An exemplary output of amplifier 240 may include the first DC voltage.

In an exemplary embodiment, step 172 may include digitizing the first DC voltage by applying the first DC voltage to ADC 216. In an exemplary embodiment, ADC 216 may convert the first DC voltage to a corresponding digital number.

In an exemplary embodiment, step 174 may include sending the output of ADC 216 to processor 208. In an exemplary embodiment, ADC 216 may be connected to processor 208 to provide processor 208 with a digitized version of the first DC voltage to be used in monitoring of rechargeable battery 210.

Figure 1I:
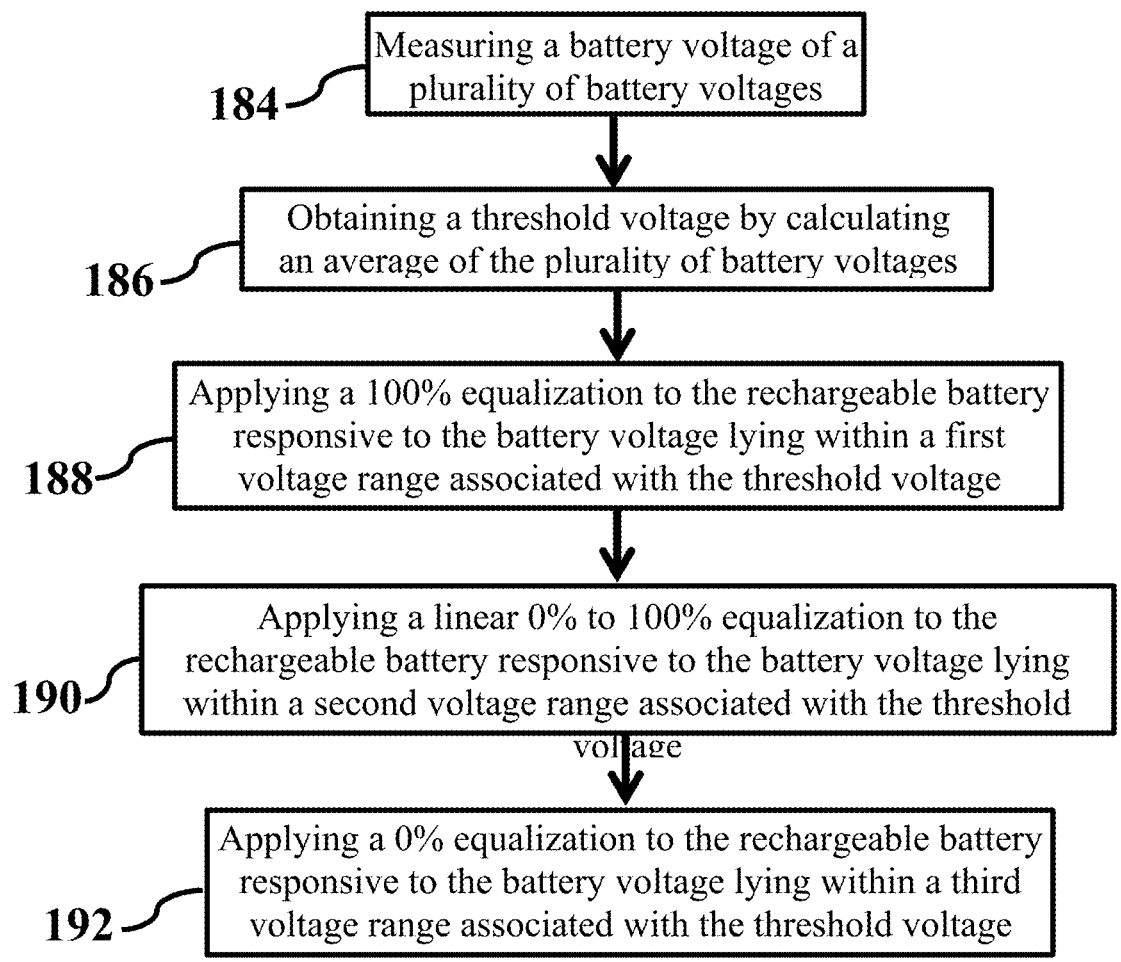
FIG. 1I shows a flowchart for balancing a rechargeable battery, consistent with one or more exemplary embodiments of the present disclosure.

Referring again to FIGS. 1B and 2B, in an exemplary embodiment, step 112 may include measuring a battery current passing through rechargeable battery 210. In further detail with regards to step 112, FIG. 1I1 shows a flowchart for measuring a battery current passing through a rechargeable battery, consistent with one or more exemplary embodiments of the present disclosure. Referring to FIGS. 1I1 and 2B, in an exemplary embodiment, measuring the battery current may include generating a second DC voltage proportional to the battery current (step 176), generating a second amplified DC voltage by amplifying the second DC voltage (step 178) generating a second digitized DC voltage by digitizing the second amplified DC voltage (step 180), and sending the second digitized DC voltage to processor 208 (step 182).

For further detail with respect to step 176, in an exemplary embodiment, generating the second DC voltage may include applying the battery current to a Hall effect sensor. An exemplary a Hall effect current sensor may include a converter that outputs a voltage in response to changes in magnetic field. In an exemplary embodiment, an output voltage of the Hall effect current sensor may correspond to an amplitude of the battery current. By applying relatively large magnetic fields, an output voltage of an exemplary Hall effect current sensor may be in the order of microvolts. Exemplary amplifier, voltage regulator, and logic switching circuits may be used to increase a sensitivity of the Hall effect current sensor and reach a desired output with high accuracy and low hysteresis error.

In an exemplary embodiment, step 178 may include amplifying the second DC voltage. For this purpose, an exemplary second DC voltage may be applied to a second amplifier of BMK 202. An exemplary second amplifier may increase an amplitude of the second DC voltage to obtain the second amplified DC voltage.

In an exemplary embodiment, step 180 may include generating the second digitized DC voltage by digitizing the second amplified DC voltage. For this purpose, an exemplary output of the second amplifier may be applied to ADC 216. In an exemplary embodiment, ADC 216 may convert the second amplified DC voltage to a corresponding digital number.

In an exemplary embodiment, step 182 may include sending the output of ADC 216 to processor 208. In an exemplary embodiment, ADC 216 may be connected to processor 208 to provide processor 208 with the second digitized DC voltage to be used in monitoring of rechargeable battery 210.

Referring again to FIGS. 1A and 2A, in an exemplary embodiment, step 104 may include balancing rechargeable battery 210. In an exemplary embodiment, performance of battery bank 209 may be limited by a battery with lowest capacity because, the whole batteries in a string of battery bank 209 may be effectively discharged when a battery cell with lowest capacity is discharged. An exemplary charging state of rechargeable battery 210 may be determined by measuring a state of charge (SOC) of rechargeable battery 210. An exemplary charge level may refer to a ratio of remaining charge to a charging capacity of rechargeable battery 210. Obtaining exemplary SOC of rechargeable battery 210 may require voltage, charging and discharging currents and temperature of rechargeable battery 210. In an exemplary embodiment, system 200 may use a combination of battery monitoring alongside with battery cell balancing to improve performance of rechargeable battery 210.

An exemplary balancing system may be utilized to make a charge level of a healthy battery be independent of other battery cells, and reduce a mismatch of charge levels between various cells and aging effects of each cell. In an exemplary embodiment, system 200 may include a passive balancing system. An exemplary passive balancing system may allow all battery cells to exhibit same capacity. Initially, in an exemplary embodiment, all battery cells in battery bank 209 may include equal capacities. However, as time passes, exemplary cell parameters' similarity may decrease due to charge/discharge cycles, high temperatures, and general aging. An exemplary low-capacity battery cell may be charged and discharged faster than cells with a higher capacity. Therefore, an exemplary low-capacity battery cell may limit a performance of battery bank 209. An exemplary passive balancing may allow battery bank 209 to appear so that each cell includes a capacity equal to a lowest capacity cell. An exemplary passive balancing may discharge high SOC battery cells by a relatively low current during a charge cycle, and thus all cells may be charged to a maximum SOC.

Figure 2C:
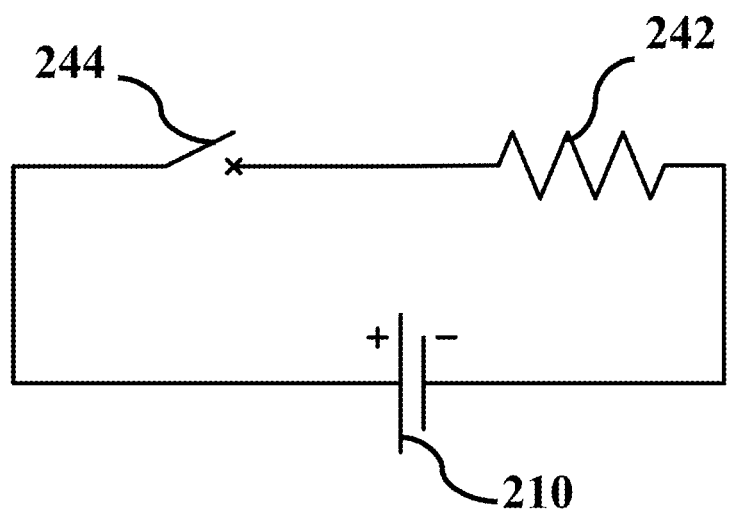
FIG. 2C shows a block diagram of an equalizer circuit, consistent with one or more exemplary embodiments of the present disclosure.

FIG. 2C shows a block diagram of an equalizer circuit, consistent with one or more exemplary embodiments of the present disclosure. In an exemplary embodiment, equalizer circuit may act as a balancing system for rechargeable battery 210. Referring to FIGS. 1A, 2B, and 2C, in an exemplary embodiment, balancing rechargeable battery 210 in step 104 may include coupling equalizer circuit 204 to rechargeable battery 210. In an exemplary embodiment, coupling equalizer circuit 204 to rechargeable battery 210 may include directly connecting of each terminal of equalizer circuit 204 to a respective terminal of rechargeable battery 210. An exemplary balancing in step 104 may be implemented utilizing equalizer circuit 204. In an exemplary embodiment, equalizer circuit 204 may include a resistor 242 and a switch 244 arranged as in FIG. 2C. In an exemplary embodiment, a battery cell with a high SOC may be turned off during a charging process until all other cells are charged properly. For this purpose, in an exemplary embodiment, switch 244 may remain closed until rechargeable battery 210 is balanced to a desired equalization level. An exemplary passive balancing may result in equal SoC for all battery cells as described below.

In further detail with regards to step 104, FIG. 1I shows a flowchart for balancing a rechargeable battery, consistent with one or more exemplary embodiments of the present disclosure. Referring to FIGS. 1I, 2A and 2B, in an exemplary embodiment, balancing rechargeable battery 210 may include measuring a battery voltage of a plurality of battery voltages in battery bank 209 (step 184), obtaining a threshold voltage by calculating an average of the plurality of battery voltages (step 186), applying a 100% equalization to rechargeable battery 210 responsive to the battery voltage lying within a first voltage range (step 188), applying a linear 0% to 100% equalization to rechargeable battery 210 responsive to the battery voltage lying within a second voltage range (step 190), and applying a 0% equalization to rechargeable battery 210 responsive to the battery voltage lying within a third voltage range (step 192).

Figure 1J:
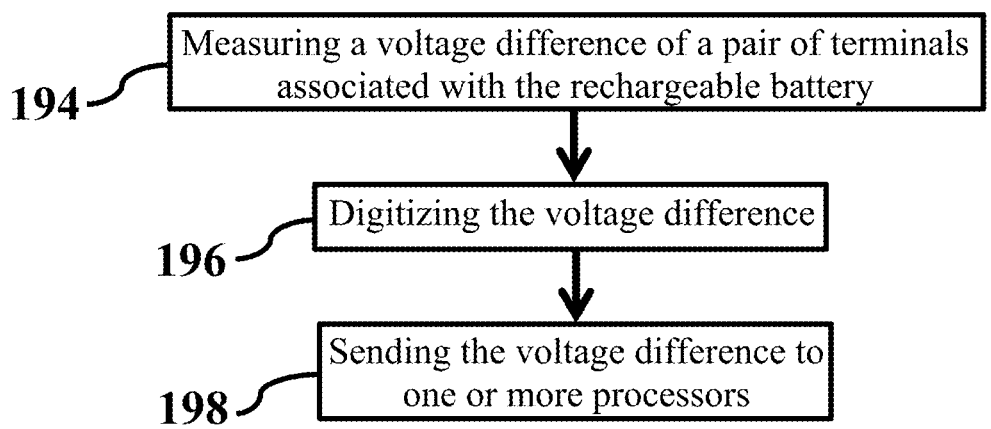
FIG. 1J shows a flowchart for measuring a battery voltage, consistent with one or more exemplary embodiments of the present disclosure.

For further detail with respect to step 184, FIG. 1J shows a flowchart for measuring a battery voltage, consistent with one or more exemplary embodiments of the present disclosure. Referring to FIGS. 1J and 2B, in an exemplary embodiment, measuring the battery voltage may include measuring a voltage difference of a pair of terminals associated with rechargeable battery 210 (step 194), generating a digitized voltage difference by digitizing the voltage difference (step 196) and sending the digitized voltage difference to processor 208 (step 198).

In further detail regarding step 194, in an exemplary embodiment, measuring the voltage difference may include coupling voltage sensor 218 of BMK 202 to rechargeable battery 210. In an exemplary embodiment, voltage sensor 218 may include a differential amplifier. An exemplary differential amplifier may include one or more amplifiers that may measure a difference between voltages at a pair of terminals of rechargeable battery 210.

In an exemplary embodiment, step 196 may include generating the digitized voltage difference by digitizing the voltage difference. For this purpose, an exemplary voltage difference may be applied to ADC 216. In an exemplary embodiment, ADC 216 may convert the voltage difference to a corresponding digital number.

In an exemplary embodiment, step 198 may include sending the output of ADC 216 to processor 208. In an exemplary embodiment, ADC 216 may be connected to processor 208 to provide processor 208 with the digitized voltage difference to be used in balancing rechargeable battery 210.

Referring again to FIGS. 1I and 2B, in an exemplary embodiment, step 186 may include obtaining the threshold voltage. For this purpose, an average of an exemplary plurality of battery voltages (that may be obtained in step 184) may be calculated utilizing processor 208.

For further detail with respect to step 188, an exemplary first voltage range may include voltage values higher than the threshold values with a predetermined margin. In an exemplary embodiment, each voltage value in the first voltage range may be at least 60 mV larger than the threshold value. If an exemplary battery voltage lies within the first voltage range, a 100% equalization may be applied to rechargeable battery 210. For this purpose, in an exemplary embodiment, equalizer circuit 204 may be coupled to rechargeable battery 210 in parallel and processor 208 may keep switch 244 closed (for example, by sending a switching command) until the 100% equalization of rechargeable battery 210 is completed.

In further detail with regards to step 190, an exemplary second voltage range may include a neighboring range of the threshold value. In an exemplary embodiment, a difference of each voltage value in the second voltage range from the threshold value may be at most 10 mV. If an exemplary battery voltage lies within the second voltage range, a linear 0% to 100% equalization may be applied to rechargeable battery 210. For this purpose, in an exemplary embodiment, equalizer circuit 204 may be coupled to rechargeable battery 210 in parallel and processor 208 may keep switch 244 closed (for example, by sending a switching command) until the linear equalization of rechargeable battery 210 is completed.

In further detail regarding step 192, an exemplary third voltage range may include voltage values lower than the threshold value with a predetermined margin. In an exemplary embodiment, each voltage value in the third voltage range may be at least 10 mV smaller than the threshold value. If an exemplary battery voltage lies within the third voltage range, a 0% equalization may be applied to rechargeable battery 210.

Referring again to FIG. 1A, in an exemplary embodiment, step 106 wherein, determining performance of the rechargeable battery may include extracting a state of health (SOH) and a state of charge (SOC) of the battery based on the plurality of parameters.

Figure 4:
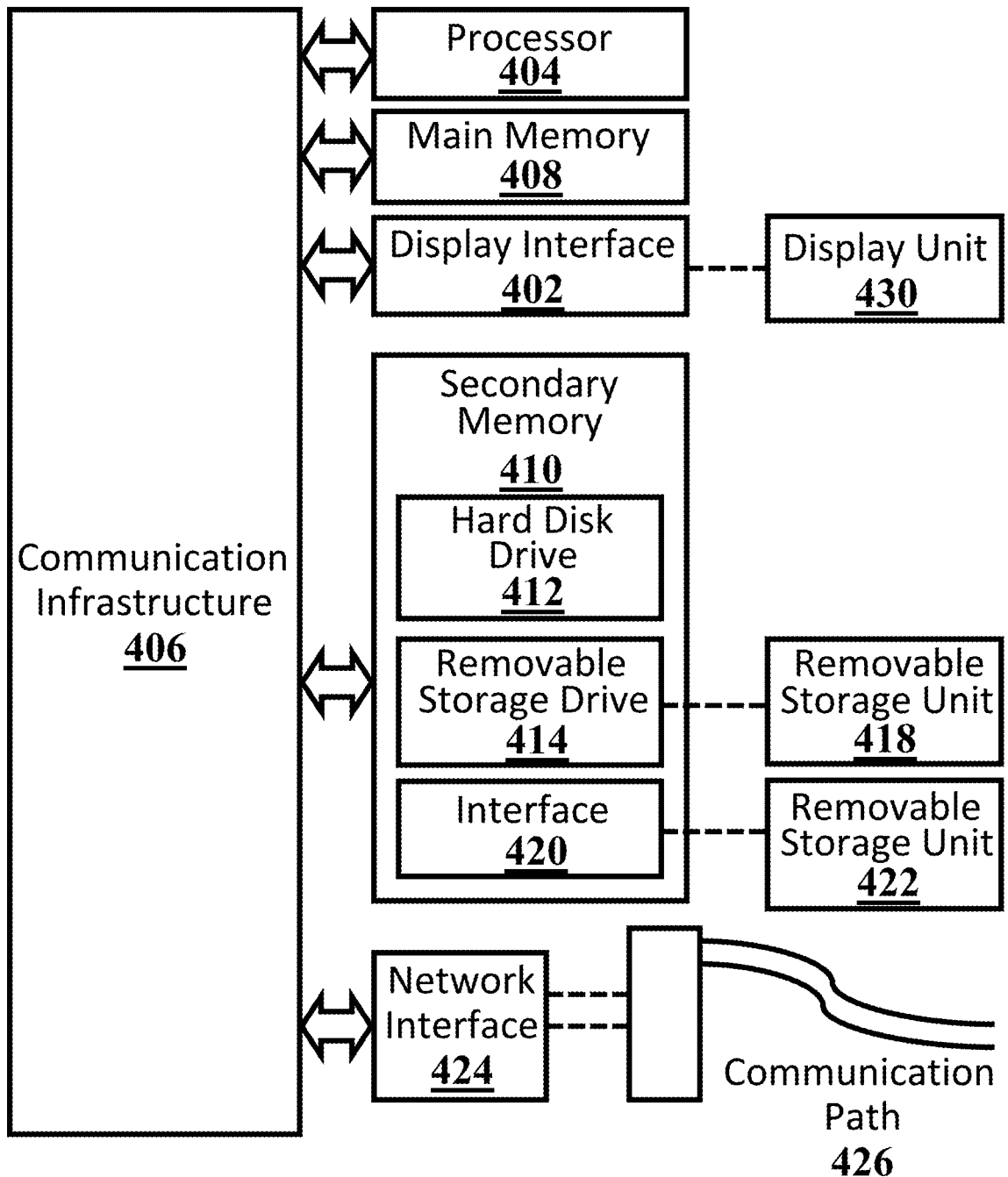
FIG. 4 shows a high-level functional block diagram of a computer system, consistent with one or more exemplary embodiments of the present disclosure.

FIG. 4 shows an example computer system 400 in which an embodiment of the present invention, or portions thereof, may be implemented as computer-readable code, consistent with exemplary embodiments of the present disclosure. For example, different steps of method 100 may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-2B, for example, processor 208 in FIGS. 2A and 2B.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose (e.g., a graphical processing unit) or a general-purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 404 may be connected to a communication infrastructure 406, for example, a bus, message queue, network, or multi-core message-passing scheme.

In an exemplary embodiment, computer system 400 may include a display interface 402, for example a video connector, to transfer data to a display unit 430, for example, a monitor. Computer system 400 may also include a main memory 408, for example, random access memory (RAM), and may also include a secondary memory 410. Secondary memory 410 may include, for example, a hard disk drive 412, and a removable storage drive 414. Removable storage drive 414 may include a floppy disk drive, a magnetic tape drive, an optical disk drive, a flash memory, or the like. Removable storage drive 414 may read from and/or write to a removable storage unit 418 in a well-known manner. Removable storage unit 418 may include a floppy disk, a magnetic tape, an optical disk, etc., which may be read by and written to by removable storage drive 414. As will be appreciated by persons skilled in the relevant art, removable storage unit 418 may include a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement different embodiments of the present disclosure as discussed herein. In particular, the computer programs, when executed, enable processor device 404 to implement the processes of the present disclosure, such as the operations in method 100 illustrated by flowcharts of FIGS. 1A-FIG. 1J discussed above. Accordingly, such computer programs represent controllers of computer system 400. Where an exemplary embodiment of method 100 is implemented using software, the software may be stored in a computer program product and loaded into computer system 400 using removable storage drive 414, interface 420, and hard disk drive 412, or communications interface 424.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A system for monitoring a rechargeable battery in a battery bank, the system comprising:
    a battery monitoring kit (BMK), comprising:
        a signal generator directly connected to the rechargeable battery and configured to generate a plurality of excitation signals, each excitation signal of the plurality of excitation signals comprising a respective excitation frequency of a plurality of excitation frequencies;
        a reference resistor coupled to the rechargeable battery in series;
        an analog interface coupled to the rechargeable battery, the analog interface configured to:
            measure a plurality of AC resistor voltages of the reference resistor, each of the plurality of AC resistor voltages associated with a respective excitation signal of the plurality of excitation signals; and
            measure a plurality of AC voltages of the rechargeable battery, each of the plurality of AC voltages associated with the respective excitation signal of the plurality of excitation signals;
        a memory having processor-readable instructions stored therein; and
        one or more processors configured to access the memory and execute the processor-readable instructions, which, when executed by the one or more processors configures the one or more processors to:
            calculate an electrochemical impedance of the rechargeable battery by applying an electrochemical impedance spectroscopy method to the plurality of AC resistor voltages and the plurality of AC voltages; and
            balance the rechargeable battery based on a respective voltage of each battery in the battery bank.

2. The system of claim 1, further comprising a voltage sensor coupled to the rechargeable battery, the voltage sensor configured to measure a battery voltage of a plurality of battery voltages associated with the battery bank by measuring a voltage difference of a pair of terminals associated with the rechargeable battery, wherein the battery voltage is associated with the rechargeable battery.

3. The system of claim 2, wherein:
    the one or more processors are further configured to:
        send a first switching command to the analog interface; and
        send a second switching command to the analog interface; and
    the analog interface comprises:
        an electrical switch, each terminal of the electrical switch directly connected to a respective terminal of the rechargeable battery, the electrical switch configured to:
            receive the first switching command from the one or more processors;
            pass the plurality of AC resistor voltages through the reference resistor by being coupled to the reference resistor in parallel responsive to receiving the switching command from the one or more processors;
            receive the second switching command from the one or more processors; and
            pass the plurality of AC voltages by being coupled to the rechargeable battery in parallel responsive to receiving the second switching command from the one or more processors;
        a DC level shifter coupled to the electrical switch, the DC level shifter configured to:
            generate a plurality of DC level shifted resistor voltages from the plurality of AC resistor voltages by removing DC values of the plurality of AC resistor voltages; and
            generate a plurality of DC level shifted battery voltages from the plurality of AC voltages by removing DC values of the plurality of AC voltages;
        a first analog filter coupled to the DC level shifter, the first analog filter configured to:
            generate a first plurality of filtered resistor voltages by filtering the plurality of DC level shifted resistor voltages; and
            generate a first plurality of filtered battery voltages by filtering the plurality of DC level shifted battery voltages;
        an amplifier coupled to the first analog filter, the amplifier configured to:
            generate a plurality of amplified resistor voltages by amplifying the first plurality of filtered resistor voltages; and
            generate a plurality of amplified battery voltages by amplifying the first plurality of filtered battery voltages;
        a second analog filter coupled to the amplifier, the second analog filter configured to:
            generate a second plurality of filtered resistor voltages by filtering the plurality of amplified resistor voltages; and
            generate a second plurality of filtered battery voltages by filtering the plurality of amplified battery voltages;
        an analog peak detector coupled to the second analog filter, the analog peak detector configured to:
            generate a plurality of resistor voltage amplitudes by detecting amplitudes of the second plurality of filtered resistor voltages; and generate a plurality of battery voltage amplitudes by detecting amplitudes of the second plurality of filtered battery voltages; and an analog phase detector coupled to the second analog filter, the analog phase detector configured to:

generate a plurality of resistor voltage phases by detecting phases of the second plurality of filtered resistor voltages; and generate a plurality of battery voltage phases by detecting phases of the second plurality of filtered battery voltages.

4. The system of claim 3, further comprising an analog-to-digital converter (ADC) coupled to each of the analog peak detector and the analog phase detector, the ADC configured to:

generate a plurality of digitized resistor voltage amplitudes by digitizing the plurality of resistor voltage amplitudes;

generate a plurality of digitized battery voltage amplitudes by digitizing the plurality of battery voltage amplitudes;

generate a plurality of digitized resistor voltage phases by digitizing the plurality of resistor voltage phases;

generate a plurality of digitized battery voltage phases by digitizing the plurality of battery voltage phases;

generate a digitized voltage difference by digitizing the voltage difference; and send the plurality of digitized resistor voltage amplitudes, the plurality of digitized battery voltage amplitudes, the plurality of digitized resistor voltage phases, the plurality of digitized battery voltage phases, and the digitized voltage difference to the one or more processors.

5. The system of claim 4, wherein the one or more processors are further configured to obtain a threshold voltage by calculating an average of the plurality of battery voltages.

6. The system of claim 5, further comprising an equalizer circuit coupled to the rechargeable battery in parallel, each terminal of the equalizer circuit directly connected to a respective terminal of the rechargeable battery, the equalizer circuit configured to:

apply a 100% equalization to the rechargeable battery responsive to the battery voltage lying within a first voltage range associated with the threshold voltage;

apply a 0% to 100% linear equalization to the rechargeable battery responsive to the battery voltage lying within a second voltage range associated with the threshold voltage; and apply a 0% equalization to the rechargeable battery responsive to the battery voltage lying within a third voltage range associated with the threshold voltage.

7. The system of claim 6, wherein the BMK further comprises a temperature sensor coupled to the rechargeable battery, the temperature sensor configured to measure a temperature of the rechargeable battery by generating a first DC voltage proportional to the temperature.

8. The system of claim 7, further comprising a Hall effect sensor coupled to the rechargeable battery, the Hall effect sensor configured to measure a battery current passing through the rechargeable battery by generating a second DC voltage proportional to the battery current.

9. A method for monitoring a rechargeable battery in a battery bank, the method comprising:

measuring, utilizing a battery monitoring kit (BMK), a plurality of parameters associated with the rechargeable battery, measuring the plurality of parameters comprising measuring an electrochemical impedance of the rechargeable battery by:

generating, utilizing a signal generator of the BMK, a plurality of excitation signals, each excitation signal of the plurality of excitation signals comprising a respective excitation frequency of a plurality of excitation frequencies;

applying each of the plurality of excitation signals to the rechargeable battery by coupling the signal generator to the rechargeable battery;

measuring a plurality of AC resistor voltages of a reference resistor in the BMK by coupling an analog interface of the BMK to the rechargeable battery, each of the plurality of AC resistor voltages associated with a respective excitation signal of the plurality of excitation signals;

measuring a plurality of AC voltages of the rechargeable battery by coupling the analog interface to the rechargeable battery, each of the plurality of AC voltages associated with a respective excitation signal of the plurality of excitation signals; and calculating, utilizing one or more processors, the electrochemical impedance by applying an electrochemical impedance spectroscopy method to the plurality of AC resistor voltages and the plurality of AC voltages;

balancing, utilizing the one or more processors, the rechargeable battery based on a respective voltage of each battery in the battery bank; and determining, utilizing the one or more processors, performance of the rechargeable battery based on the plurality of parameters.

10. The method of claim 9, wherein measuring the plurality of AC resistor voltages comprises:

passing the plurality of AC resistor voltages through an electrical switch of the analog interface by:

passing the plurality of excitation signals through the reference resistor by coupling the reference resistor to the rechargeable battery in series; and passing, utilizing the one or more processors, the plurality of AC resistor voltages through the electrical switch by coupling the electrical switch to the reference resistor in parallel;

generating a plurality of DC level shifted resistor voltages by applying the plurality of AC resistor voltages to a DC level shifter of the analog interface;

generating a first plurality of filtered resistor voltages by applying the plurality of DC level shifted resistor voltages to a first analog filter of the analog interface;

generating a plurality of amplified resistor voltages by applying the first plurality of filtered resistor voltages to an amplifier of the analog interface;

generating a second plurality of filtered resistor voltages by applying the plurality of amplified resistor voltages to a second analog filter of the analog interface;

generating a plurality of resistor voltage amplitudes by applying the second plurality of filtered resistor voltages to an analog peak detector of the analog interface;

generating a plurality of resistor voltage phases by applying the second plurality of filtered resistor voltages to an analog phase detector of the analog interface;

generating a plurality of digitized resistor voltage amplitudes by applying the plurality of resistor voltage amplitudes to an analog-to-digital converter (ADC) of the analog interface;

generating a plurality of digitized resistor voltage phases by applying the plurality of resistor voltage phases to the ADC; and sending the plurality of digitized resistor voltage amplitudes and the plurality of digitized resistor voltage phases to the one or more processors.

11. The method of claim 10, wherein measuring the plurality of AC voltages comprises:

passing, utilizing the one or more processors, the plurality of AC voltages through the electrical switch by coupling the electrical switch to the rechargeable battery in parallel;

generating a plurality of DC level shifted battery voltages by applying the plurality of AC voltages to the DC level shifter;

generating a first plurality of filtered battery voltages by applying the plurality of DC level shifted battery voltages to the first analog filter;

generating a plurality of amplified battery voltages by applying the plurality of filtered battery voltages to the amplifier;

generating a second plurality of filtered battery voltages by applying the plurality of amplified battery voltages to the second analog filter;

generating a plurality of battery voltage amplitudes by applying the second plurality of filtered battery voltages to the analog peak detector;

generating a plurality of battery voltage phases by applying the second plurality of filtered battery voltages to the analog phase detector;

generating a plurality of digitized battery voltage amplitudes by applying the plurality of battery voltage amplitudes the ADC;

generating a plurality of digitized battery voltage phases by applying the plurality of battery voltage phases to the ADC; and sending the plurality of digitized battery voltage amplitudes and the plurality of digitized battery voltage phases to the one or more processors.

12. The method of claim 11, wherein balancing the rechargeable battery comprises:

measuring a battery voltage of a plurality of battery voltages associated with the battery bank, the battery voltage associated with the rechargeable battery;

obtaining a threshold voltage by calculating an average of the plurality of battery voltages;

applying a 100% equalization to the rechargeable battery responsive to the battery voltage lying within a first voltage range associated with the threshold voltage;

applying a linear 0% to 100% equalization to the rechargeable battery responsive to the battery voltage lying within a second voltage range associated with the threshold voltage; and applying a 0% equalization to the rechargeable battery responsive to the battery voltage lying within a third voltage range associated with the threshold voltage wherein applying each of the 100% equalization, the linear 0% to 100% equalization, and the 0% equalization comprises coupling an equalizer circuit to the rechargeable battery in parallel.

13. The method of claim 12, wherein measuring the battery voltage comprises:

measuring a voltage difference of a pair of terminals associated with the rechargeable battery by coupling a voltage sensor of the BMK to the rechargeable battery;

generating a digitized voltage difference by applying the voltage difference to the ADC; and sending the digitized voltage difference to the one or more processors.

14. The method of claim 13, wherein measuring the plurality of parameters further comprises measuring a temperature of the rechargeable battery by:

coupling a temperature sensor of the BMK to the rechargeable battery;

generating a first DC voltage proportional to the temperature by applying an output of the temperature sensor to a first amplifier of the BMK;

digitizing the first DC voltage by applying the DC voltage to the ADC; and sending the ADC output to the one or more processors.

15. The method of claim 14, wherein measuring the plurality of parameters further comprises measuring a battery current passing through the rechargeable battery by:

generating a second DC voltage proportional to the battery current by applying the battery current to a Hall effect sensor;

amplifying the second DC voltage by applying the second DC voltage to a second amplifier;

digitizing an output of the second amplifier by applying the output of the second amplifier to the ADC; and sending the ADC output to the one or more processors.

16. The method of claim 15, wherein:

coupling the equalizer circuit to the rechargeable battery comprises directly connecting each terminal of the equalizer circuit to a respective terminal of the rechargeable battery;

coupling the signal generator to the rechargeable battery comprises directly connecting each terminal of the signal generator to a respective terminal of the rechargeable battery; and coupling the electrical switch to the rechargeable battery comprises directly connecting each terminal of the electrical switch to a respective terminal of the rechargeable battery.

17. The method of claim 15, wherein determining performance of the battery comprises extracting a state of health (SOH) and a state of charge (SOC) of the rechargeable battery from the plurality of parameters.

* * * * *